May 7, 1935. T. A. JENKINS 2,000,446
LIQUID CHILLING APPARATUS
Filed Oct. 24, 1933 3 Sheets-Sheet 2

INVENTOR.
Thomas A. Jenkins

May 7, 1935. T. A. JENKINS 2,000,446
LIQUID CHILLING APPARATUS
Filed Oct. 24, 1933 3 Sheets-Sheet 3
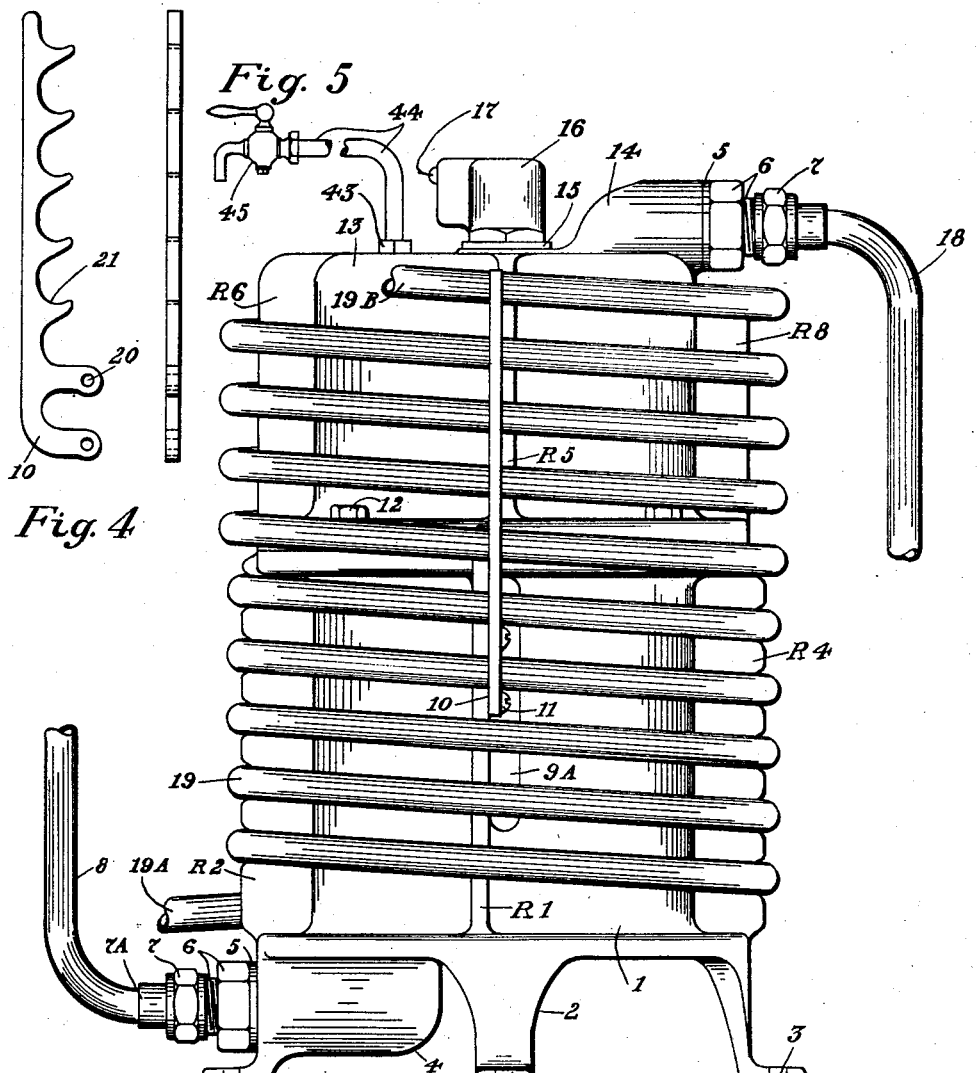
Fig. 5
Fig. 4
Fig. 6
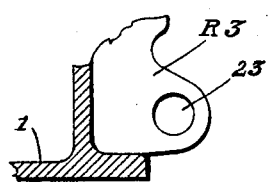
Fig. 7
INVENTOR.
Thomas A. Jenkins Patented May 7, 1935

2,000,446

UNITED STATES PATENT OFFICE 2,000,446

LIQUID CHILLING APPARATUS

Thomas Alfred Jenkins, Roselle, N. J.

Application October 24, 1933, Serial No. 694,954

3 Claims. (Cl. 62—141)

My invention relates to improvements, in liquid chilling apparatus and consists of the construction; combinations and arrangements, herein described and claimed.

The general object of my invention, is the provision, in a manner as hereinafter set forth, of a liquid chilling apparatus of unique design; compact; durable; sanitary; efficient and inexpensive, in operating maintenance.

The fundamental object of my invention, is the provision of a highly efficient; regulative and sanitary liquid chilling tank, having as a primary object, the palatable and healthful preparation of beer, before dispensing for human consumption. The proper preparation of beer for consumption, is a vital matter from the standpoint of health. Beer that is excessively cold, interferes with the digestive organs of consumers. It is also rendered flat and is not palatable. Beer excessively warm, becomes wild; foams and lacks a solid body and is objectionable, in not being palatable. Beer is a food product and subject to bacterial formations, if dispensed through apparatus, not sanitarily designed. Vital points of sanitary design are, ready accessibility and non-secretive, pocketless walls. In the handling of beer, through chilling apparatus, various physical conditions arise, such as, gas and air pockets and it is essential that provisions be made to control such conditions. Air and gas pockets, interfere with the proper functioning of dispensing apparatus. It is desirable, that beer in particular and other liquid beverages, in passing through a liquid chilling tank, be properly cooled or chilled, before serving, this and other desirable functions mentioned, can be achieved with the liquid chilling apparatus, constituting my invention.

The invention will be best understood, from a consideration of the following detailed description, taken in connection with the accompanying drawings, forming a part of this specification, with the understanding, that the invention is not confined to any strict conformity, with the showing of the drawings, but may be changed and modified, so long as such changes and modifications make no material departure, from the salient features of the invention, as expressed in the appended claims.

In the drawings:

Figure 4 is a detailed view, of a supporting bracket, for secondary refrigerant circulating tube.

Figure 5 is a projected view of Fig. 4.

Figure 6 is an elevation of complete chilling tank.

Figure 7 is a fragmental sectional view, of a heat conducting rib, on bottom unit of chilling tank, showing a supporting hole, for secondary refrigerant circulating tube, taken along line 7—7 of Fig. 3.

Referring now, to the drawings in detail, like numerals of reference, indicate corresponding parts, throughout the several views.

Figure 1:
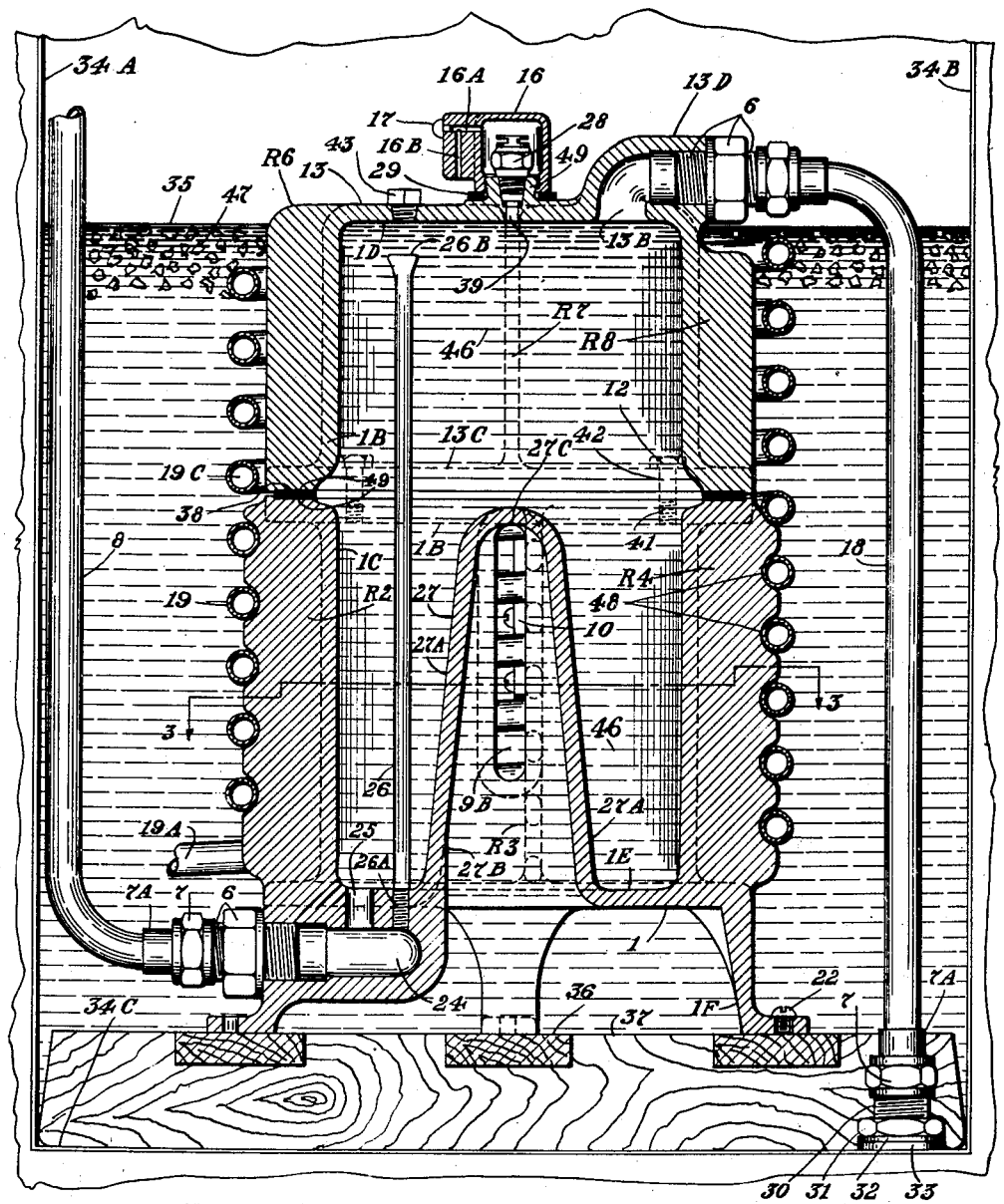
Figure 1 is a longitudinal section, through the complete chilling tank, taken along line 1—1 of Fig. 2.

The apparatus in general, is a tank of unique design and of compact, durable construction, having sanitary and simplified arrangements, producing efficient, inexpensive functional performance. The tank as a whole, is composed of two major parts, a bottom unit and a top unit. Numeral 1, indicates the whole bottom unit and numeral 13, the whole top unit. Each of the tank units, 1 and 13, have an abutting flange, as 13C and 1B. Between flanges 13C and 1B, is a composition gasket 38, for completing an airtight seal. Flange 13C, has a plurality of clearance holes 42. Flange 1B, has a plurality of tapped holes 41, aligned with clearance holes 42. A plurality of bolts 12, pass through clearance holes 42 in flange 13C, then through corresponding holes, not shown, in gasket 38 and fasten in tapped holes 41, thereby joining the bottom unit 1 and top unit 13, of the tank in general. Bottom unit of tank 1, has formed integral thereto, at the base, a hollow protuberant structure 27. Numeral 27B, indicates an exterior wall and 27A an interior wall of protuberant structure 27.

Figure 3:
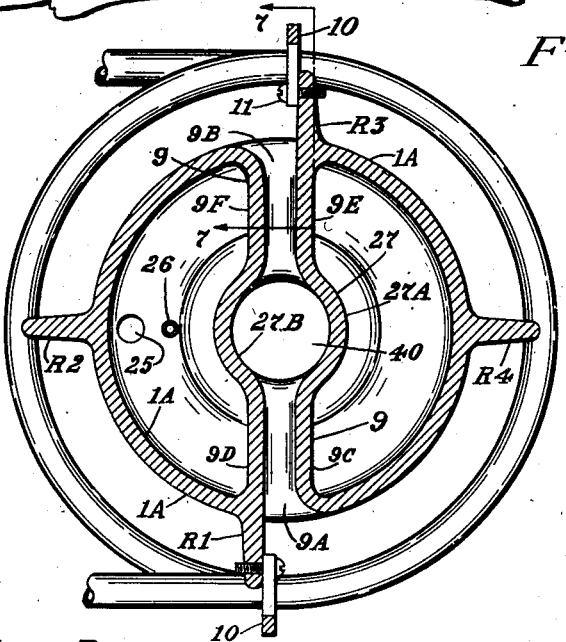
Figure 3 is a transverse section, taken along line 3—3 of Fig. 1.

Fig. 1, numeral 9B shows one of a plurality of openings in hollow ribs. Fig. 3, shows a transverse section through hollow ribs 9, which joins the wall of hollow protuberant structure 27, to adjoining wall 1A of tank. In Fig. 3, is shown openings 9A and 9B of hollow ribs 9, coinciding with cavity 40, of hollow protuberant structure 27.

Fig. 1, numeral 35 indicates a liquid secondary refrigerant, generally clear water, technically termed "sweet" water. Numeral 47 indicates a primary refrigerant, which is ice. Numeral 46, indicates a liquid or beverage, contained in chilling tank. Contained liquid 46, comes in contact with wall 27A, of protuberant structure 27 and interior walls of tank 1B; 1C; 1D and 1E and in Fig. 3, interior walls 9C; 9D; 9E and 9F of hollow ribs 9. Fig. 1, secondary liquid refrigerant 35, comes in contact with exterior surface 27B of protuberant structure 27 and in Fig. 3, exterior walls of openings 9A and 9B of hollow ribs 9. Fig. 1, numeral 47 indicates cracked ice, submerged in secondary liquid refrigerant 35. In general, contained liquid 46, is in contact, with all interior surfaces of chilling tank. All exterior surfaces of chilling tank, are in contact with secondary liquid refrigerant 35. The functions are as follows:—The contained liquid 46, on entering chilling tank, contains an amount of heat, whereas the secondary liquid refrigerant 35, is at a low temperature and through surface contact, will absorb sufficient heat from contained liquid 46, to lower same, to a temperature equivalent to a cool or chilled degree. By limiting the volume of secondary liquid refrigerant 35 and the quantity of primary refrigerant 47, the degree of chilling, contained liquids 46, can be satisfactorily controlled. In the final analysis, the atmosphere completes the transfer, of absorbed heat, from the cracked ice 47. To continue the transfer of heat, from the contained liquid 46, to the secondary refrigerant 35, it will be necessary to replenish a supply of cracked ice 47, shown submerged in secondary refrigerant 35. To further exemplify the picture in Fig. 1, it is well to note, that the secondary liquid refrigerant 35, is retained by a receptacle or cooler box, into which the chilling tank as a whole, is placed.

Figure 2:
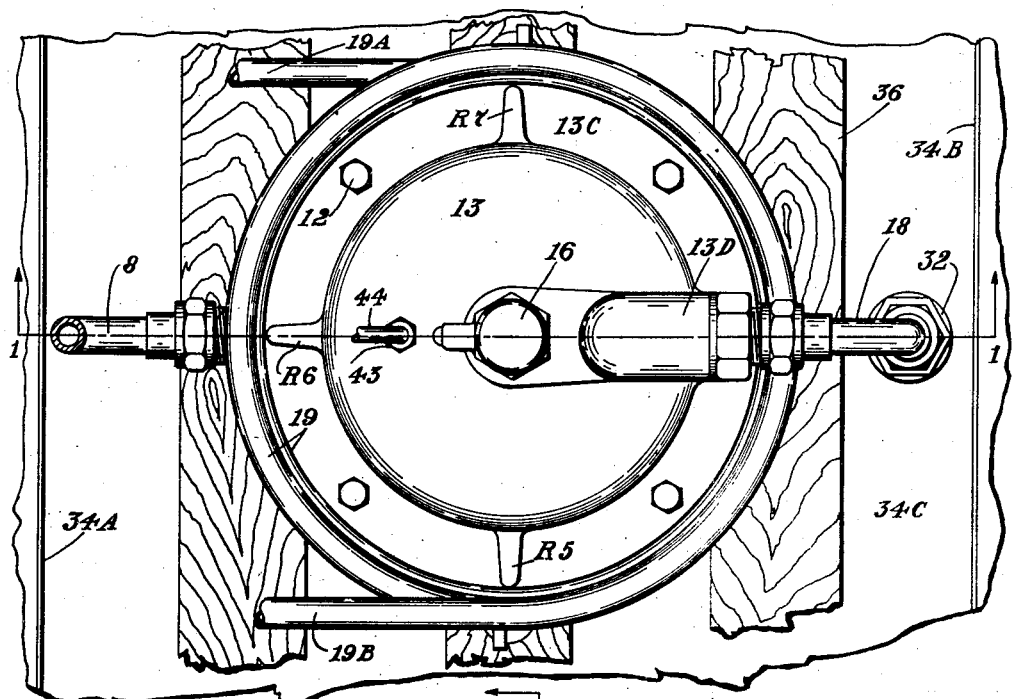
Figure 2 is a plan view of chilling tank, showing fragmentary view, of a chilling tank receptacle.

Owing to the fact, that mechanical refrigeration, is in many cases, preferred to ice, provision has been made, for accommodating either choice, as a combinational arrangement. Formed integral with bottom unit 1, of chilling tank, is a plurality of heat conducting ribs, as R2; R3 and R4 of Fig. 1 and R1, as in Fig. 3. Formed integral with said heat conducting ribs R2; R3; R4 and R1, are a plurality of semi-circular notches, spirally aligned, to receive a spirally wound tube 19. In Fig. 7, is shown rib 3, with a hole 23, for receiving and securing, the first lap of the spirally wound tube 19. In Fig. 1, tube 19 is shown in section. Said tube 19, is used to convey a circulating refrigerant, around the chilling tank. In Fig. 2, at 19A and 19B, is shown the two ends of tube 19. One end is the inlet and the other is the outlet, the direction of flow, to be determined as required. The ends 19A and 19B, are to be fitted with commercial couplings, not shown, and can be connected to any commercial refrigerating unit desired. When connected to a refrigerating unit, a primary refrigerant, will circulate through tube 19, as at 19C of Fig. 1 and continuously absorb heat from secondary liquid refrigerant 35, which in turn, absorbs heat from contained liquids 46, through surface contact. With a refrigerating unit in use, cracked ice 47, would be eliminated. With this arrangement, either ice or mechanical refrigeration, can be used as desired. If the tank is connected to a refrigerating unit, and it should get out of order at any time, cracked ice, can be submerged in secondary liquid refrigerant 35 and the chilling tank, will continue to function. This is vital to business, as it avoids interruption of service.

In the event, that the required amount of tubing 19, reaches above the bottom unit 1, of chilling tank, a tube supporting bracket, shown in views, Figs. 4 and 5, has been provided. The tube rests on surfaces 21. In Fig. 6, is shown, tube supporting bracket 10 in place. Same is fastened to heat conducting rib R1, Fig. 6 and R3, Fig. 1. In Fig. 6, is shown screws 11, which fasten tube support brackets 10, to respective ribs. In Fig. 4, holes 20 are for fastening screws 11, shown in Fig. 6.

Referring to hollow ribs 9, Fig. 3, note openings 9A; 9B and 40. The secondary liquid refrigerant 35, circulates by reason of varying temperature, through openings 9A and 9B of hollow ribs 9, as at Fig. 3 and continues downward through cavity 40 of protuberant structure 27. In Fig. 1, note at 27C, that the upper wall of hole 9B or 9A, is flush with the highest point, of the exterior wall of protuberant structure 27. This is essential, to prevent air pockets forming and consequently insulating part of the conducting surface. This arrangement, facilitates the circulation of the secondary liquid refrigerant 35, through the hollow ribs 9, Fig. 3 and protuberant structure 27, Fig. 1.

To increase heat conducting surface, the bottom unit 1, of chilling tank, has formed integral therewith, a plurality of ribs R2; R3 and R4 of Fig. 1 and R1 shown in Figs. 3 and 6. Also, top unit 13 of chilling tank, has formed integral thereto, a plurality of ribs R6; R7 and R8 of Fig. 1 and R5 Figs. 2 and 6, for the same purpose.

In Fig. 1, numerals 34A; 34B and 34C, indicate interior surfaces of a chilling tank receptacle or cooler box. Resting on the bottom of chilling tank receptacle, are two or more strips of wood or other material 37, which support a number of horizontally laid strips 36. Bottom unit 1, of chilling tank, has a plurality of legs 1F, formed integral thereto. Said legs, have holes 3, as at Fig. 6, for receiving screws. In Fig. 1, numeral 22, shows one of a number of screws, used to fasten bottom unit 1 of chilling tank, to strips 37.

Fig. 1, numeral 18 is an inlet pipe, through which liquid passes into chilling tank. Inlet pipe 18, connects to a source of beverage or other liquid supply. Numeral 8, is an outlet pipe and leads to a dispensing faucet. Numerals 6; 7 and 7A, are pipe fittings. In Fig. 6, numeral 5 is a gasket. Numeral 13B is the inlet port and numeral 24 is the outlet port, for contained liquids. Numeral 25, is the orifice through which liquid in chilling tank, enters outlet port 24.

Fig. 1, numeral 26 is a siphon tube and is screwed into hole 26A. At 26B, is shown a flared orifice, which acts to increase suction. When liquid in chilling tank, flows out through orifice 25, a suction will be created through siphon tube 26 and if an air or gas pocket exists, at the upper portion of chilling tank, as at or near 26B, said pocket will be broken by the action of suction created. The inlet port 13B, is arranged to permit the free, unagitated entrance of liquid, into chilling tank. The same condition exists at outlet port 24; there are no disturbing obstructions, to cause agitation of contained liquids.

Liquids entering chilling tank, are circulated under air pressure. Every time the supply tank empties, air enters the chilling tank and in general the whole system. When replenishing the supply of liquids for chilling tank, the air admitted, must be removed from the system, to prevent an air lock. The air is removed by bleeding, through a pet cock 45, conveniently located and connected, by way of tube 44, to fitting 43, which is fastened to top unit 13, of chilling tank, shown in Fig. 6. Any air, not removed, will be carried off through siphon tube 26. In case beer is handled in chilling tank, gas forms, if same reaches too high a temperature. Such gas will be removed, through the action of siphon tube 26, Fig. 1. Numeral 28, is a relief valve and in case a vacuum exists in system at any time, said valve will respond and relieve same.

Numeral 16, is a protective hood and guards against material injury to valve 28. Numeral 49, is a threaded boss, formed integral with top unit 13, of chilling tank and is for fastening protective hood 16. Numeral 29, is a gasket between flange of hood 16 and top unit 13 and is for making a tight seal. Numerals 16A and 16B, are drilled holes. Numeral 17, is a plug. The purpose of holes 16A and 16B, is to form an air lock and prevent flooding of valve 28, in the event of an overflow of secondary liquid refrigerant 35. Numeral 39, is a hole in top unit 13 and leads to valve element. Numeral 13D, is the exterior of inlet port of chilling tank. Numeral 49, indicates recessed pockets, for retaining a gasket and preventing blow out of same, when pressure within chilling tank exists.

Having thus described my invention, I claim as new and desire to secure by Letters Patent, the following:—

1. In an apparatus of the type described, a liquid chilling tank, composed of a bottom unit, having formed integral thereto, at the base, a hollow protuberant structure, with a plurality of hollow ribs, connecting said hollow protuberant structure, to adjoining wall of chilling tank, to increase heat conducting surface and effect rapid transfer of heat from liquids in chilling tank, to a liquid refrigerant, in contact with exterior surfaces of chilling tank, a top unit, forming a component part of chilling tank.

2. In an apparatus of the type described, a liquid chilling tank, composed of a bottom unit, having formed integral thereto, at the base, interiorly located, a hollow protuberant structure, with a plurality of hollow ribs, branching therefrom and connecting to adjoining wall of chilling tank, a plurality of cavities or passage ways, in said hollow ribs, terminating at cavity of said protuberant structure, thereby providing means, to increase circulation of a liquid refrigerant, in contact with exterior surfaces of chilling tank, a top unit, forming a component part of chilling tank.

3. In an apparatus of the type described, a liquid chilling tank, composed of a bottom unit, having formed integral thereto, at the base, interiorly located, a hollow protuberant structure, with a plurality of hollow ribs, branching therefrom and connecting to adjoining wall of chilling tank, a plurality of cavities or passage ways, in said hollow ribs, terminating at cavity of said protuberant structure, thereby providing means, to increase circulation of a liquid refrigerant in contact with exterior surfaces of chilling tank, means for preventing formation of air pockets, in said passage ways and cavity of said protuberant structure, by arrangement of top surfaces of said passage ways and cavity, in flush formation, a top unit, forming a component part of chilling tank.

THOMAS A. JENKINS.